United States Patent Office 3,252,967
Patented May 24, 1966

3,252,967
AZO BASIC DYES
Roland Entschel and Curt Mueller, Basel, and Walter Wehrli, Riehen, Switzerland, assignors to Sandoz Ltd., also known as Sandoz A.G., Basel, Switzerland
No Drawing. Filed Apr. 19, 1962, Ser. No. 188,837
Claims priority, application Switzerland, Apr. 21, 1961, 4,709/61; Jan. 12, 1962, 359/62
10 Claims. (Cl. 260—158)

This invention relates to a process for the production of basic dyes of the formula

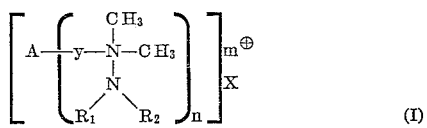
(I)

wherein

A represents the radical of a dye free from carboxylic acid and sulfonic acid groups,
y a substituted or unsubstituted methylene group or a divalent radical bound to the adjacent N through such a methylene group,
$R_1$ hydrogen or the methyl group,
$R_2$ hydrogen or the methyl group,
$n$ the integer 1 or 2,
$m$ the integer 1 or 2 when $n$ is 1, or 2 when $n$ is 2, and
X an anion equivalent to a dye cation;

the said process is characterized by replacing or converting, the $n$ symbols Z in a compound of the formula $$B(y-Z)_n \quad (II)$$

by, or into, $n$ groups of the formula

(III)

wherein B stands for A or the radical of a compound permitting the formation of a dye A, and Z for a substituent which can be replaced by, or converted into, a group of the Formula III, whereupon the reaction product is converted into a dye when B represents the radical of a compound which permits the formation of a dye.

One mode of operation for the production of the new basic dyes is characterized by reacting 1 mol of a compound of the formula $$B(y-E)_n \quad (IV)$$

wherein E represents the acid radical of an ester, with $n$ mols of a compound of the formula

(V)

and converting the reaction product into a dye when B stands for the radical of a compound which permits the formation of a dye.

It is also possible to quaternate a compound of the formula

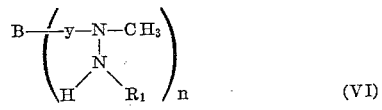
(VI)

with an agent yielding methyl groups, and to convert the reaction product into a dye when B represents the radical of a compound which permits formation of a dye.

The new basic dyes of Formula I can be arrived at by alkylating a compound of the formula

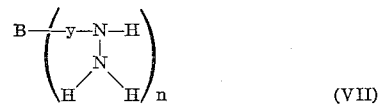
(VII)

with an agent yielding methyl groups and converting the reaction product into a dye when B represents the radical of a compound permitting the formation of a dye, or by reacting 1 mol of an amine of the formula

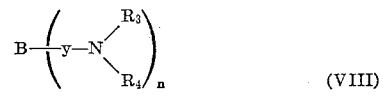
(VIII)

wherein $R_3$ represents hydrogen or the methyl group and $R_4$ hydrogen or the methyl group, with $n$ mols of a halogen amine, quaternating the reaction product with an agent yielding methyl groups if necessary, and converting it into a dye when B represents the radical of a compound which permits the formation of a dye. Here, quaternation and conversion into a dye can also be carried out in either order.

The dye radicals can be, more particularly, radicals of azo dyes. Azo dye radicals containing metal atoms bound by coordination links can also be used. The azo dye radicals consist, for the greater part, of substituted or unsubstituted mono- and dis-azo dyes. The components B which are suitable for the formation of the dye radical A are preferably those which can be converted into the above-mentioned azo dye radicals by reaction with a diazonium salt or a coupling compound.

The azo coupling reaction is carried out in the known way, preferably in a weakly alkaline to acid medium which may be buffered if necessary.

Other suitable components B are compounds which contain a functional group or a group convertible into a functional group. These compounds are reacted with the components used for the formation of the dye radical A to give the final dye of Formula I.

Methylating agents which are suitable for converting compounds of the Formulae VI, VII and, where necessary, VIII into the dye salts conforming to the present process are, e.g. the esters of strong mineral acids and organic sulfonic acids such as methyl chloride, methyl bromide and methyl iodide or dimethyl sulfate, methyl esters of low molecular alkansulfonic acids or of benzenesulfonic acid. The alkylation or quaternation is effected preferably in an inert solvent or, where suitable, in an aqueous suspension, or without solvent in an excess of the alkylating agent and at elevated temperature and in a medium which may be buffered if necessary.

The anion or anions X may be organic or inorganic ions, e.g. the ions of methyl sulfate, sulfate, disulfate, perchlorate, chloride, bromide, iodide, phosphorus molybdate, phosphorus tungsten molybdate, benzene sulfonate or 4-chlorobenzene sulfonate.

Highly suitable as bridge member y are a substituted or unsubstituted methylene group or a divalent radical bound to the adjacent N through this group, e.g. —(CH$_2$)$_p$— where $p$ is the number 1 to 6,

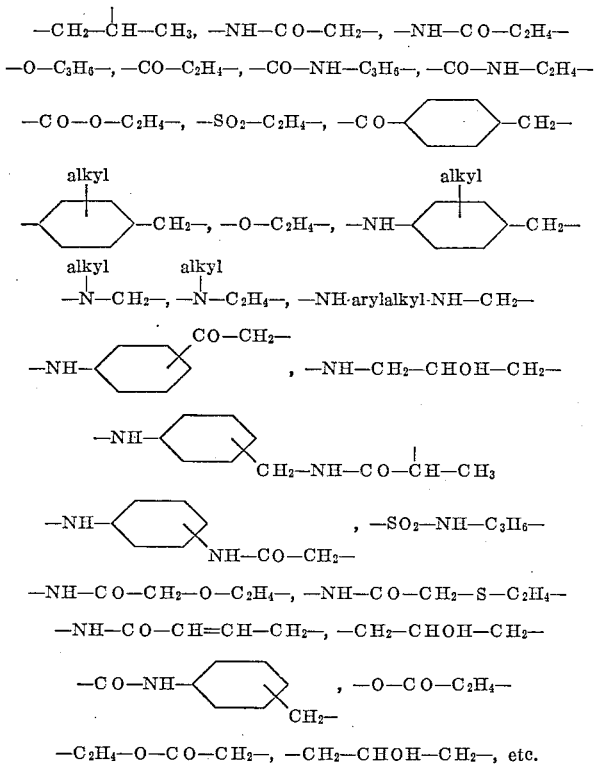

—C$_2$H$_4$—O—C O—CH$_2$—, —CH$_2$—CHOH—CH$_2$—, etc.

Examples of suitable acid radicals E are those of sulfuric acid, (E=SO$_4$H), a sulfonic acid (E=SO$_3$R where R is a substituted or unsubstituted hydrocarbon radical) and hydrogen sulfide (E=SH), but preferably the radicals of the halogen hydracids (E=Cl, Br etc.) are employed.

The reaction of a compound of Formula IV with a hydrazine of the Formula V is effected preferably in an organic solvent and at the temperatures of —50° C. to +250° C. The reaction can also be carried out in aqueous medium, if necessary with the addition of an organic solvent, or without solvent at the above-stated temperatures.

The reaction of an amine of Formula VIII with a halogenamine is carried out preferably in an organic solvent and at temperatures of —50° to +80° C. The reaction can also be effected in aqueous medium if necessary with the addition of an organic solvent, at the above-stated temperatures. The halogenamine can be employed either in gaseous form or in solution in an organic solvent, in water, or in a solvent-water mixture.

The dyes formed are separated by one of the basic operations such as filtration, evaporation and filtration, precipitation from a suitable medium and filtration.

The new dyes are excellent for dyeing, padding and printing materials of polymers containing more than 80% acrylonitrile, e.g. polyacrylonitrile, e.g. Orlon (registered trade mark), and copolymers containing 80–90% acrylonitrile and 20–10% vinyl acetate, methyl acrylate or methyl methacrylate.

These products are marketed under the following names, most of which are registered trademarks: Acrilan (the copolymer of 85% acrylonitrile and 15% vinyl acetate or vinyl pyridine), Orlon, Dralon, Courtelle, Crylor, Dynel, etc.

The dyeings on these materials obtained with the dyes of the process possess good fastness to light, washing, perspiration, sublimation, pleating, decatizing, pressing, water, sea water, bleaching, dry cleaning, cross dyeing and solvents.

The dyes of the present process are dyed to best advantage from aqueous medium, and it is preferable for the medium to be neutral or acid and of boiling temperature.

The commercially available retarding agents can be used in dyeing without adverse effect, though the new dyes produce perfectly level dyeings on the above-named polymers and copolymers without the addition of these agents. The dyes can be applied in closed equipment and under pressure, as they are highly stable to prolonged boiling. They also give very good dyeings on blend fabrics containing a polyacrylonitrile fiber or acrylonitrile copolymer fiber as one of the components. A selected number of the new dyes are suitable for dyeing polyacrylonitrile in the mass in shades fast to light and wet fastness treatments. The dyes of the present process which possess good solubility in organic solvents are suitable for the coloration of oils, paint and lacquer media, and plastics, and for the dyeing of fiber-forming materials in the spinning solution. They have many other uses, for example, the dyeing of tannin-treated cotton, wool, silk, regenerated cellulose, synthetic polyamide fibers, and paper, at all stages of manufactures it has been found that mixtures of two or more dyes of Formula I can be used with good success.

The new dyes are well suited for combination, so that dye salts of the same or different dye classes can be used for producing widely different shades.

The azo dyes obtained by the present process may belong, for example, to the benzene-azo-benzene, benzene-azo-napthalene, benzene-azo-pyrazolone, benzene-azo-acylacetic acid arylamide, benzene-azo-phenyl, benzene-azo-benzene-azo-phenol, thiazoleazo-benzene, thia-diazol-azo-pyrazolone, pyridine-azo-indole or quinoline-azo-benzene series etc. They can be produced by the known methods, either by coupling diazotized amines with azo components, or by oxidation coupling. The hydrazinium group can be linked to the diazo- and/or the azo component through a substituted or unsubstituted methylene group or through a methylene group on the adjacent N-bound divalent radical, in certain cases alongside other cationic groups.

Diazo compounds of the benzene, naphthalene and heterocyclic series are suitable for the production of the azo dyes of the present process. The substituents in these compounds are preferably those which are employed in the known disperse (acetate) and polyester dyes. Particularly suitable are chlorine, bromine, fluorine, nitrile, nitro, alkyl, trihalogenalkyl, alkylsulfonyl, sulfonamide, monalkyl, and dialkyl-sulfonamide, carbalkoxy, carboxylic acid amide, hydroxyl, alkoxy and carbalkoxy groups.

Suitable coupling components are the derivatives of the benzene, naphthalene and heterocyclic series. Particularly suitable are the substituted aminobenzene derivatives which may be further substituted by alkyl groups and the derivatives substituted in the aromatic nucleus by e.g. substituted or unsubstituted alkyl, alkoxy, halogen, cyan, trifluoromethyl, alkanoylamino, alkylsulfonylamino etc. The term "alkyl radical" refers not only to radicals such as methyl, ethyl, propyl and butyl, but also to their substitution products (cf. E. de Barry, Anthracene and Anthraquinone, London 1921, p. 207). The substituents or substitution products which may be mentionde as examples are halogen, hydroxyl, as e.g. in the chloropropyl, hydroxyethyl and dihydroxypropyl radicals, ethers and esters, e.g. methoxyethyl and acetoxyalkyl radicals, the esters of carboxylic and sulfonic acids, e.g. in the carbalkoxyalkyl radical and the nitrile group, as e.g. in the cyanethyl radical.

In the following examples the parts and percentages are by weight and the temperatures in degrees centigrade.

In the specification and examples the symbol K stands for the grouping

EXAMPLE 1

18.4 parts of N-ethyl-N-β-chloroethyl-aminobenzene are dissolved in 100 parts of methanol and after adding 7.2 parts of 1,1-dimethyl-hydrazine the solution is heated at the boil with reflux for 24 hours. The solvent is then evaporated and the pulverised residue washed with a little benzene and dried. It is dissolved in 400 parts of water and coupled with hydrochloric acid diazonium solution produced in the normal way from 16 parts of 1-amino-2-chloro-4-nitrobenzene. The dye is precipitated with a little sodium chloride, filtered, washed with 1% sodium chloride solution and dried. A dark red-brown powder with a melting point of 220–221° is obtained. The dye is purified by recrystallization and its melting point is then 234–236°.

Dyeing Example A 20 parts of the dye obtained according to Example 1 are intimately mixed with 80 parts of dextrin in a ball mill for 48 hours.

1 part of this preparation is pasted with 1 part of acetic acid 40%, 400 parts of distilled water at 60° are poured over the paste with constant agitation and the whole boiled for a short time. The solution is diluted with 7600 parts of distilled water, and 2 parts of glacial acetic acid are added. 100 parts of "Orlon" (registered trademark) are entered in this bath at 60°. The material was pretreated for 10–15 minutes at 60° in a bath of 8000 parts of water and 2 parts of glacial acetic acid. The dye-bath is brought to 100° in 30 minutes, boiled for 1 hour and the material rinsed. A level red dyeing of excellent light fastness and very good wet fastness is obtained.

Pad dyeing Example B

A padding liquor is prepared with:

50 parts per liter of dye (corresponding to the dyeing preparation produced in the previous dyeing example)
3 parts per liter of sodium alginate
5 parts per liter of acetic acid conc.
20 parts per liter of a cationic softener e.g. a condensation product of 1 mol stearic acid and 1 mol triethanolamine
25 parts per liter of Glauber's salt Polyacrylonitrile fiber material is padded cold by the usual method on a 2 or 3 bowl pad. The pick-up is 80%. After intermediate drying for a short time at 90° on tenters, in a hot flue or by infrared radiation, the material is fixed for 1–3 minutes with dry air at 170–190° on tenters, subsequently rinsed, soaped and rinsed again. A red dyeing with excellent light fastness is obtained.

Textile printing example

A printing paste is made up with:

75 parts of dye (corresponding to the dyeing preparation produced in the previous dyeing example)
10 parts of the acetic acid conc.
450 parts of sodium alignite thickening
25 parts of a cationic softener, e.g. a condensation product of 1 mol stearic acid and 1 mol triethanolamine
25 parts of Glauber's salt
415 parts of water 1000 parts Polyacrylonitrile fiber material is printed according to the usual hand-block printing process and subsequently air-dried, steamed for 20–30 minutes in a star steamer with saturated steam, rinsed, soaped, rinsed again and dried. On polyacrylonitrile fabrics a red print with very good fastness properties is obtained.

EXAMPLE 2

37.5 parts of the dye 2-chloro-4-nitro-4'-(N-ethyl-N-dimethylaminoethyl)-amino-1,1'-azobenzene are dissolved at room temperature in 900 parts of chlorobenzene. 7.1 parts of freshly prepared gaseous chloramine are added to this solution at 30° with thorough stirring in the course of 1 hour. The dye salt formed is precipitated and can be isolated by filtration from the chlorobenzene.

On drying, a red powder is obtained which dyes "Orlon" (registered trademark) in level red shades of good light and wet fastness.

In each case the production of chloramine is effected by the usual methods described in the literature (cf. e.g., G. H. Coleman, Inorganic Syntheses, vol. I, p. 59; Omietanski, Inorganic Syntheses, vol. V, p. 92; Gmelins, Handbook of Inorganic Chemistry, 8th edition (1926), p. 418).

An ethereal chloramine solution, produced for example according to Inorganic Syntheses I, can be used for the process of the invention in place of gaseous chloramine.

In the latter case the dye salt is produced by dissolving 37.5 parts of the dye 2-chloro-4-nitro-4'-(N-ethyl-N-dimethylaminoethyl)-amino-1,1'-azobenzene at room temperature in 1500 parts of chlorobenzene. In the course of 1 hour the ether solution containing about 7 parts of chloramine is run into this solution with thorough stirring at 25–30°. The dye salt is precipitated and can be filtered off.

EXAMPLE 3

19.7 parts of the diazo solution of 1-amino-2-cyano-4-nitro-6-chlorobenzene produced in the normal way are coupled at 0–5°, with the addition of ice, with an aqueous solution which contains 23 parts of the compound of the formula

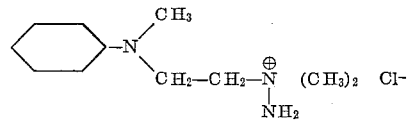

Coupling is completed with the addition of sodium acetate in portions. The water-soluble monazo dye formed is precipitated from the aqueous solution by the addition of common salt, filtered, washed with a dilute sodium chloride solution and dried. A dark powder is obtained which dyes polyacrylonitrile fibers in level bluish red shades of good light and wet fastness.

Dyeing Example C 20 parts of the dye obtained according to Example 2 are intimately ground with 80 parts of dextrin in a ball mill for 48 hours.

1 part of this preparation is then pasted with 1 part of acetic acid 40%, 400 parts of distilled water at 60° poured over the paste with constant agitation and the whole boiled. The solution is diluted with 7600 parts of distilled water and 2 parts of glacial acetic acid are added. 100 parts of "Orlon" (registered trademark) are entered in this bath at 60°. The material was pretreated for 10–15 minutes at 60° in a bath of 8000 parts of water and 2 parts of glacial acetic acid. The dyebath is brought to 100° in 30 minutes, boiled for 1 hour and the material rinsed and dried.

Dyeing Example D

The dye obtained according to Example 3, after grinding with dextrin or Glauber's salt or with another inorganic or organic diluent, can be applied as given in Dyeing Example C. In place of 2 parts of glacial acetic acid either a mixture of 5 parts of Glauber's salt, 3 parts of sodium acetate and 2 parts of glacial acetic acid, or 2 parts of concentrated sulfuric acid can be added to the dyebath.

EXAMPLE 4

A hydrochloric acid diazonium salt solution produced in the normal way from 17.25 parts of 1-amino-2-chloro-4-nitrobenzene at 0° is adjusted to a pH value of 5–6 with sodium acetate. On filtering clear, the cold diazonium salt solution is obtained and added with thorough stirring to 34 parts of a compound of the formula

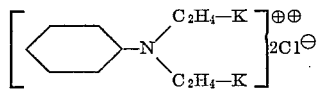

dissolved in 290 parts of water. The dye is precipitated immediately. It is filtered, washed with dilute common salt solution and dried. A dye is obtained which has the formula

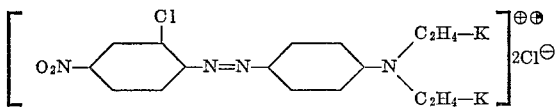

The dye melts at 248° and dyes polyacrylonitrile fibers in strong, level, orange shades. The dyeings show very good fastness to light, wet treatments, heat setting and gas fumes.

The above-named coupling component is obtained by reacting 1 mol of di-(dimethyl-aminoethyl)-aniline of the formula

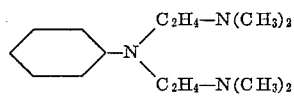

with 2 mols of chloramine. The salt melts at 215° with decomposition.

EXAMPLE 5

17.25 parts of 1-amino-2-chloro-4-nitrobenzene in finely divided form are stirred into 100 parts of 15% hydrochloric acid at 0°. On the addition of 27 parts of a 4n-sodium nitrite solution the diazonium salt solution is formed in almost quantitative yield within 30 minutes at 0°.

By adding 21 parts of a compound of the formula

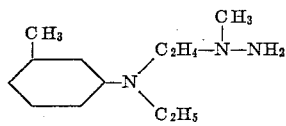

in solution in 100 parts of glacial acetic acid at 0°, the desired dye formation commences immediately. The coupling reaction is accelerated by rendering the solution weakly acid with sodium acetate. On completion of coupling the dye is filtered off, rinsed free of salt with water and dried.

The dye obtained is of low water solubility, and has the formula

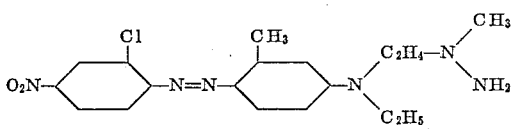

It can be used directly for dyeing polyacrylonitrile by applying it in an acid, preferably mineral acid dyebath.

The resulting dyeings are level and have good fastness properties.

The azo compound used for the production of the dye described can be obtained by the known method, i.e. by reacting N-β-chloroethyl-N-ethylmetatoluidine with an excess of monomethylhydrazine at about 100°, then separating the reaction product and distilling with high vacuum.

EXAMPLE 6

42.05 parts of the dye described in Example 5 are dissolved in 1000 parts of chlorobenzene at 80°. 19 parts of dimethylsulfate in solution in 19 parts of chlorobenzene are added dropwise with stirring, and stirring continued for 2 hours at 80–90°. The solution is allowed to cool, the salt filtered off and dried. The dye salt is obtained as a dark red powder. The compound of the formula

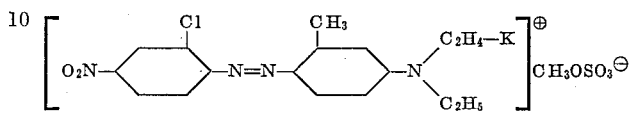

dyes polyacrylonitrile in dark red shades.

EXAMPLE 7

A dye identical to that described in Example 6 but consisting of an anionic mixture of Cl⊖ and CH₃OSO₃⊖, is obtained when 20.7 parts of the intermediate product

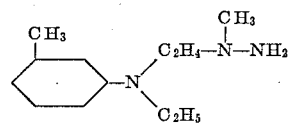

in chlorobenzene are converted into the hydrazinium salt of the formula

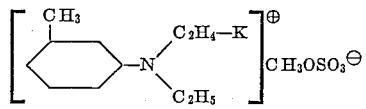

with 19 parts of dimethyl sulfate and subsequently combined with 17.25 parts of a hydrochloric acid solution of diazonium salt prepared with 1-amino-2-chloro-4-nitrobenzene, and the dye salt isolated by the known methods.

The pure chloride can be produced with the aid of an anion exchanger. The dye of the formula

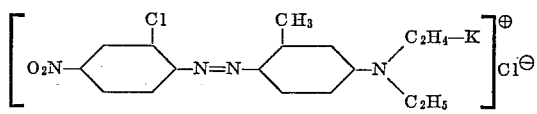

melts at 218–219°.

EXAMPLE 8

8 parts of finely pulverized, anhydrous sodium nitrite are added to 105 parts of sulfuric acid 96% at the temperature range of 60–70°. When this is completely dissolved, the nitrosylsulfuric acid formed is cooled to 15–20°. 100 parts of glacial acetic acid are run in at 20° and then 16.3 parts of 2-amino-5-nitrobenzonitrile are strewn in, followed by a further 100 parts of glacial acetic acid.

The solution is stirred for 2–3 hours at 15°. The excess nitrite is destroyed by the addition of 5 parts of urea and the solution then discharged into 350 parts of water. The diazonium salt solution at 0° is filtered off and reacted with 24.4 parts of a compound of the formula

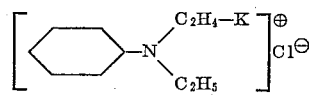

in solution in 200 parts of water.

The coupling reaction slowly commences; the pH value is brought to 5.5 by the addition of ammonia, upon which the coupling reaction takes place immediately so that the product can be filtered, rinsed and dried at once. The dye salt of the formula 8(a)

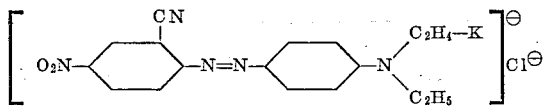

with a melting point of 196-199° dyes polyacrylonitrile fibers in ruby shades.

When in this example the diazo compound 2-amino-5-nitrobenzonitrile is replaced by 26.2 parts of 2,4-dinitro-6-bromoaniline, a corresponding dye salt is obtained which melts at 180-189° and dyes polyacrylonitrile fibers and polyester fibers modified by the introduction of acid groups in red-brown shades.

The dye produced from the diazo compound 2-bromo-4-nitroaniline, melts at 226-228°. It dyes polyacryonitrile fibers in full red shades.

When in place of 2-bromo-4-nitroaniline, 2-methylsulfonyl-4-nitroaniline is used as diazo compound, a dye of the formula 8(b)

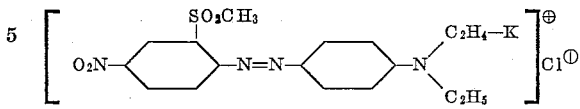

is obtained which has a melting point of 229-230° and gives ruby shades.

Further valuable basic monoazo dyes, which can be produced by the procedure given in the above examples, are described in the following table A:

They correspond to the formula

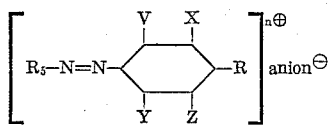

Suitable anions are those already named in the specification.

| Example No. | $R^5$ | V | X | Y | Z | R | Shade of (I) the Dyeing on Polyacrylonitrile |
|---|---|---|---|---|---|---|---|
| 9 | 4-nitrophenyl | H | H | H | H | $-N \begin{smallmatrix} CH_3 \\ CH_2-CH_2-K \end{smallmatrix}$ | Orange. |
| 10 | 4-nitro-2-bromo-phenyl | H | H | H | H | $-N \begin{smallmatrix} C_4H_9 \\ CH_2-CH_2-K \end{smallmatrix}$ | Red. |
| 11 | ----do---- | H | H | H | H | $-N \begin{smallmatrix} C_2H_4-CN \\ CH_2-CH_2-K \end{smallmatrix}$ | Scarlet. |
| 12 | ----do---- | H | H | H | H | $-N \begin{smallmatrix} C_2H_4-OH \\ CH_2-CH_2-K \end{smallmatrix}$ | Red. |
| 13 | ----do---- | H | H | H | H | $-N \begin{smallmatrix} C_2H_4-O-CO-CH_3 \\ CH_2-CH_2-K \end{smallmatrix}$ | Red. |
| 14 | 4-chloro-2-nitro-phenyl | H | H | H | H | $-N \begin{smallmatrix} C_2H_5 \\ CH_3 \\ CH_2-CH_2-K \end{smallmatrix}$ | Orange. |
| 15 | 4-nitro-2-cyano-phenyl | H | -H | -CH_3 | H | $-N \begin{smallmatrix} C_2H_5 \\ CH_2-CH_2-K \end{smallmatrix}$ | Ruby. |
| 16 | 2,4-dinitrophenyl | H | -OC_2H_5 | -CH_3 | H | $-N \begin{smallmatrix} C_2H_5 \\ CH_2-CH_2-K \end{smallmatrix}$ | Red-violet. |
| 17 | ----do---- | H | H | -CH=CH-CH=CH- | | $-N \begin{smallmatrix} H \\ C_2H_4-K \end{smallmatrix}$ | Blue. |
| 18 | 2,4-dinitro-6-chloro-phenyl | H | H | H | H | $N \begin{smallmatrix} C_2H_4-O-CO-CH_2-K \\ C_2H_5 \end{smallmatrix}$ | Yellow-brown. |
| 19 | ----do---- | H | H | -CH_3 | H | $-N \begin{smallmatrix} C_2H_5 \\ CH_2-CH_2-K \end{smallmatrix}$ | Red-violet. |
| 20 | 4-nitro-2-cyano-6-chlorophenyl | H | H | H | H | $-N \begin{smallmatrix} C_2H_5 \\ CH_2-CH_2-K \end{smallmatrix}$ | Violet. |

| Example No. | R⁵ | V | X | Y | Z | R | Shade of (I) the Dyeing on Polyacrylonitrile |
|---|---|---|---|---|---|---|---|
| 21 | 2,4-dinitro-6-bromo-phenyl. | H | H | H | H | $-N\begin{matrix}C_2H_5\\CH_2-CH_2-K\end{matrix}$ | Yellow-brown. |
| 22 | 4-nitro-2-methyl-sulfonphenyl. | H | H | CH₃ | H | $-N\begin{matrix}C_2H_5\\CH_2-CH_2-K\end{matrix}$ | Ruby. |
| 23 | 2,4-dimethylsulfon-phenyl. | H | H | —CH₃ | H | $-N\begin{matrix}C_2H_5\\CH_2-CH_2-K\end{matrix}$ | Scarlet. |
| 24 | 4-sulfonamide-2-chlorophenyl. | H | H | H | H | $-N\begin{matrix}C_2H_5\\C_2H_4-O-C_2H_4-K\end{matrix}$ | Orange. |
| 25 | 4-monomethyl-sulfonamide-2-chlorophenyl. | H | H | H | H | $-N\begin{matrix}C_2H_5\\CH_2-CHOH-CH_2-K\end{matrix}$ | Scarlet. |
| 26 | 4-nitro-2-dimethyl-sulfonamide-phenyl. | H | H | —Cl | H | $-N\begin{matrix}C_2H_5\\CH_2-CH_2-K\end{matrix}$ | Orange. |
| 27 | 2-chlorophenyl | H | H | —CF₃ | H | $-N\begin{matrix}C_2H_5\\CH_2-CH_2-K\end{matrix}$ | Yellow-orange. |
| 28 | 2-cyanophenyl | H | H | —NH—CO—CH₃ | H | $-N\begin{matrix}C_2H_5\\CH_2-CH_2-K\end{matrix}$ | Reddish-orange. |
| 29 | 2,5-dicyanophenyl | H | —OC₂H₅ | —NH—CO—C₂H₅ | H | $-N\begin{matrix}C_2H_5\\CH_2-CH_2-K\end{matrix}$ | Red. |
| 30 | 2-cyano-5-chloro-phenyl. | H | —OC₂H₅ | —NH—CO—CH₃ | H | $-N\begin{matrix}C_2H_5\\CH_2-CH_2-K\end{matrix}$ | Red. |
| 31 | 4-chloro-2-trifluoro-methyl-phenyl. | H | —OCH₃ | —NH—CO—CH₃ | H | $-N\begin{matrix}C_2H_5\\CH_2-CH_2-K\end{matrix}$ | Red. |
| 32 | 4-nitro-2-methyl-phenyl. | H | H | —O—C₂H₄—K | H | $-N\begin{matrix}C_2H_5\\C_2H_5\end{matrix}$ | Red. |
| 33 | 4-nitro-2-methoxy-phenyl. | H | H | —O—C₃H₆—K | H | $-N\begin{matrix}C_2H_5\\C_2H_5\end{matrix}$ | Orange. |
| 34 | 2-methoxyphenyl | H | H | —CO—C₂H₄—K | H | $-N\begin{matrix}C_2H_5\\C_2H_5\end{matrix}$ | Yellow. |
| 35 | 4-nitro-2-bromo-phenyl. | H | H | CH₃ | H | $-N\begin{matrix}C_2H_5\\C_2H_4-K\end{matrix}$ | Red. |
| 36 | 3-nitrophenyl | H | H | —C₂H₄—K | H | $-N\begin{matrix}C_2H_5\\C_2H_5\end{matrix}$ | Yellow. |
| 37 | 4-cyano-2-ethoxy-phenyl. | H | H | —NH—CO—C₂H₄—K | H | $-N\begin{matrix}C_3H_7\\C_3H_7\end{matrix}$ | Orange. |

| Example No. | R³ | V | X | Y | Z | R | Shade of (I) the Dyeing on Polyacrylonitrile |
|---|---|---|---|---|---|---|---|
| 38 | 4-cyano-2-mercaptophenyl. | H | H | Cl | H | $-N\begin{smallmatrix}C_2H_5\\C_2H_4-K\end{smallmatrix}$ | Do. |
| 39 | 4-hydroxy-2-ethoxyphenyl. | H | H | Cl | H | $-N\begin{smallmatrix}C_2H_5\\C_2H_4-K\end{smallmatrix}$ | Reddish-yellow. |
| 40 | 4-chloromethylsulfon-2-bromophenyl. | H | H | H | H | $-N\begin{smallmatrix}CH_3\\CH_2-CHOH-CH_2-K\end{smallmatrix}$ | Do. |
| 41 | 4-carbomethoxyphenyl. | H | H | Br | H | $-N\begin{smallmatrix}CH_3\\CH_2-CHOH-CH_2-K\end{smallmatrix}$ | Do. |
| 42 | 4-carbomethoxy-2-chlorophenyl. | H | H | $-NH-CO-CH_2-K$ | H | $-N\begin{smallmatrix}C_2H_4-CN\\C_2H_4-OH\end{smallmatrix}$ | Do. |
| 43 | Phenyl. | H | $-OC_2H_5$ | $-NH-CO-CH_2-K$ | H | $-N\begin{smallmatrix}C_2H_4-CNC\\C_2H_4-OH\end{smallmatrix}$ | Orange. |
| 44 | 4-nitro-2,6-dichlorophenyl. | H | H | H | H | $-N\begin{smallmatrix}C_2H_5\\C_2H_4-K\end{smallmatrix}$ | Yellow-brown. |
| 45 | 4-benzoylaminophenyl. | H | H | H | H | $-N\begin{smallmatrix}C_2H_5\\C_2H_4-K\end{smallmatrix}$ | Yellow. |
| 46 | 4-acetylaminophenyl. | H | H | H | H | $-N\begin{smallmatrix}C_2H_5\\C_2H_4-K\end{smallmatrix}$ | Do. |
| 47 | 4-dimethylaminosulfaminophenyl. | H | H | Br | H | $-N\begin{smallmatrix}C_2H_5\\C_2H_4-K\end{smallmatrix}$ | Do. |
| 48 | 4-methylsulfonyl-2-chlorophenyl. | H | H | H | H | $-N\begin{smallmatrix}CH_3\\C_2H_4-K\end{smallmatrix}$ | Orange. |
| 49 | 4-nitro-2-fluoromethylphenyl. | H | H | H | H | $-N\begin{smallmatrix}CH_3\\CH_2-CH_2-N(CH_3)_2-N(CH_3)_2H\end{smallmatrix}$ | Red. |
| 50 | 2,4-dinitro-6-ethylsulfonyl-amidophenyl. | H | H | H | H | $-N\begin{smallmatrix}CH_3\\CH_2-CH_2-N(CH_3)_2-N(CH_3)H\end{smallmatrix}$ | Red. |
| 51 | 4-methylsulfonyl-naphthyl-1- | H | H | H | H | $-N\begin{smallmatrix}CH_3\\CH_2-CH_2-N(CH_3)_2-N(CH_3)H\end{smallmatrix}$ | Red. |
| 52 | 4-nitro-2-fluorosulfonyl-naphthyl-1- | H | H | H | H | $-N\begin{smallmatrix}CH_3\\CH_2-CH_2-N(CH_3)_2-N(CH_3)H\end{smallmatrix}$ | Red. |
| 53 | 4-nitro-2-fluorosulfonylphenyl. | H | H | H | H | $-N\begin{smallmatrix}CH_3\\CH_2-CH_2-N(CH_3)_2-N(CH_3)H\end{smallmatrix}$ | Red. |

| Example No. | R⁵ | V | X | Y | Z | R | Shade of (I) the Dyeing on Polyacrylonitrile |
|---|---|---|---|---|---|---|---|
| 54 | 4-nitrophenyl- | H | H | —C=CH—CH=CH—<br>$\quad\;$ \|<br>$\quad\;$ OH | | —NH—C₂H₄—K | Violet. |
| 55 | do | —OH | —CO—NH—<br>(benzene ring)<br>K—CH₂ | —CH=CH—CH=CH— | | H | Red-violet. |
| 56 | 6-nitrobenzothiazolyl-2- | H | H | —Cl | H | —N(CH₃)(C₂H₄—K) | Violet. |
| 57 | 6-methylsulfonyl-benzothiazolyl-2- | H | H | —Cl | H | —N(CH₃)(C₂H₄—K) | Do. |
| 58 | 5-nitrothiadiazolyl-2- | H | H | H | H | —N(C₂H₅)(CH₂—CH₂—K) | Blue. |
| 59 | 4-phenylthiadiazolyl-2- | —CH₃ | H | H | H | —N(C₂H₅)(CH₂—CH₂—K) | Reddish blue. |
| 60 | 5-nitrothiazolyl-2- | —CH₃ | H | H | H | —N(C₂H₅)(CH₂—CH₂—K) | Blue. |
| 61 | 5-nitro-4-methyl-thiazolyl-2- | —CH₃ | H | H | H | —N(C₂H₅)(CH₂—CH₂—K) | Do. |
| 62 | 3-nitro-5-acetyl-thienyl-2- | —CH₃ | H | H | H | —N(C₂H₅)(CH₂—CH₂—K) | Do. |
| 63 | 5-cyanothiazolyl-2 | H | H | —NH—CO—C₂H₄—K | H | —N(C₂H₄—O—CO—CH₃)₂ | Reddish blue. |
| 64 | 2-(4-phenyl)-6-methylbenzothiazol. | H | H | —CH₃ | H | —N(C₂H₅)(C₂H₄—N(CH₃)₂—NHCH₃) | Red. |
| 65 | Benzothiazolyl-2- | H | H | —CH₃ | H | —N(C₂H₅)(C₂H₄—N(CH₃)₂—NHCH₃) | Violet. |
| 66 | Thiazolyl-2 | H | H | H | H | —N(C₂H₅)(C₂H₄—N(CH₃)₂—NHCH₃) | Do. |
| 67 | 4-methyl-5-ethyl-thiazolyl-2- | H | H | H | H | —N(C₂H₅)(C₂H₄—N(CH₃)₂—NHCH₃) | Blue. |
| 68 | 6-methoxybenzo-thiazolyl-2- | H | H | H | H | —N(C₂H₅)(C₂H₄—N(CH₃)₂—NHCH₃) | Blue. |
| 69 | 1,2,4-thriazolyl-3- | H | H | H | H | —N(C₂H₅)(C₂H₄—N(CH₃)₂—NHCH₃) | Red. |
| 70 | 1,3,4-thiadiazolyl-2- | H | H | H | H | —N(C₂H₅)(C₂H₅—N(CH₃)₂—NHCH₃) | Yellowish red. |
| 71 | Pyridyl-2- | H | H | H | H | —N(C₂H₅)(C₂H₄—N(CH₃)₂—N—(CH₃)₂) | Red-violet. |

| Example No. | R⁵ | V | X | Y | Z | R | Shade of (I) the Dyeing on Polyacrylonitrile |
|---|---|---|---|---|---|---|---|
| 72 | Pyridyl-4- | H | H | H | H | $-N\begin{cases}C_2H_5\\C_2H_4-N-N-(CH_3)_2\\\phantom{C_2H_4-}(CH_3)_2\end{cases}$ | Do. |
| 73 | 1,2,4-triazolyl-3- | H | H | H | H | $-N\begin{cases}C_2H_5\\CH_2-CH_2-K\end{cases}$ | Red. |
| 74 | 5-methyl-1,2,4-triazolyl-3- | H | H | H | H | $-N\begin{cases}C_2H_5\\CH_2-CH_2-K\end{cases}$ | Red. |
| 75 | 4-methylpyridyl-2- | H | H | —CN | H | $-N\begin{cases}C_2H_5\\CH_2-CH_2-K\end{cases}$ | Red-violet. |
| 76 | Benzimidazolyl-2- | H | —OCH₃ | —OCH₃ | H | $-N\begin{cases}C_2H_5\\CH_2-CH_2-K\end{cases}$ | Red. |
| 77 | Benzoxazolyl-2- | H | —OCH₃ | —OCH₃ | H | $-N\begin{cases}C_2H_5\\CH_2-CH_2-K\end{cases}$ | Red. |
| 78 | 1,3,5-triazolyl-2- | H | H | H | H | $-N\begin{cases}C_2H_5\\CH_2-CH_2-K\end{cases}$ | Red. |
| 79 | Tetrazolyl-5- | H | —OCH₃ | —CH₃ | H | $-N\begin{cases}C_2H_5\\CH_2-CH_2-K\end{cases}$ | Red. |
| 80 | Naphthothiazolyl-2- | H | H | H | H | $-N\begin{cases}C_2H_5\\CH_2-CH_2-N-N-(CH_3)_2\\\phantom{CH_2-CH_2-}(CH_3)_2\end{cases}$ | Red. |
| 81 | Diphenyl-4- | H | H | H | H | $-N\begin{cases}C_2H_4\\\phantom{}\\C_2H_4\end{cases}N-CH_2-CH_2-K$ | Yellow. |
| 82 | Diphenylamine-4- | H | H | H | H | $-N\begin{cases}C_2H_4\\\phantom{}\\C_2H_4\end{cases}N-CH_2-CH_2-K$ | Do. |
| 83 | 4'-methoxy-1,1'-diphenylamine-4- | H | H | H | H | $-N\begin{cases}C_2H_4\\\phantom{}\\C_2H_4\end{cases}N-CH_2-CH_2-K$ | Do. |
| 84 | 4-nitrophenyl- | H | H | H | H | $-N\begin{cases}C_2H_4-K\\C_2H_4-K\end{cases}$ | Orange. |
| 85 | 4-sulfonamidophenyl. | H | H | H | H | $-N\begin{cases}C_2H_5\\C_2H_4-K\end{cases}$ | Yellow. |
| 86 | 4-nitro-2-cyanphenyl. | H | H | H | H | $-N\begin{cases}C_2H_4-K\\C_2H_4-K\end{cases}$ | Red. |
| 87 | ___do___ | H | H | —NH—CO—C₂H₄—K | H | $-N\begin{cases}CH_2-CH_2-O-CO-CH_3\\CH_2-CH_2-O-CO-CH_3\end{cases}$ | Blue-red. |
| 88 | ___do___ | H | H | —NH—CO—C₂H₄—K | H | $-N\begin{cases}CH_2-CH_2-CN\\CH_2-CH_2-O-CO-CH_3\end{cases}$ | Do. |

| Example No. | $R^5$ | V | X | Y | Z | R | Shade of (I) the Dyeing on Polyacrylonitrile |
|---|---|---|---|---|---|---|---|
| 89 | do | H | H | $-C_2H_4-K$ | H | $-N(C_2H_4-OH)(C_2H_4-OH)$ | Red. |
| 90 | 4-sulfonamidophenyl- | H | H | $-C_2H_4-K$ | H | $-N(C_2H_4-CN)(C_2H_4-CN)$ | Yellow-orange. |
| 91 | do | H | H | $-C_2H_4-K$ | H | $-N(C_2H_5)(C_2H_5)$ | Orange. |
| 92 | do | H | H | $-O-C_3H_6-K$ | H | $-N(C_2H_5)(C_2H_5)$ | Do. |

The base of the hydrazine grouping need not necessarily be a coupling component of the benzene or naphthalene series as in the above examples, but can also be a heterocyclic coupling component, as e.g. in the dyes of the following formulae

EXAMPLE 93

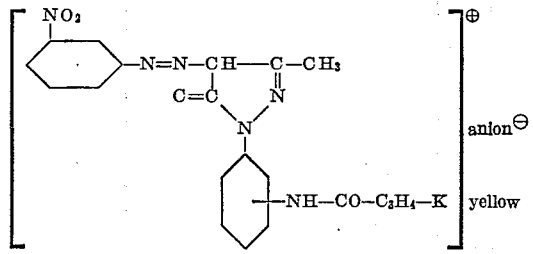

EXAMPLE 94

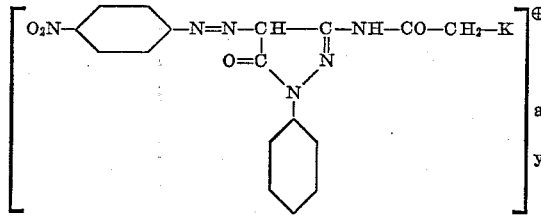

EXAMPLE 95

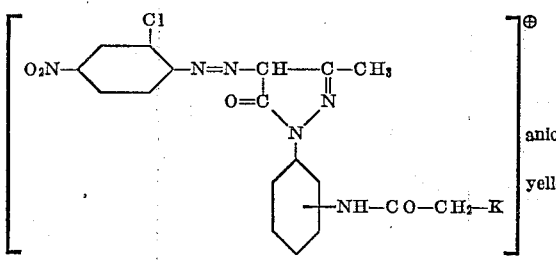

EXAMPLE 95a

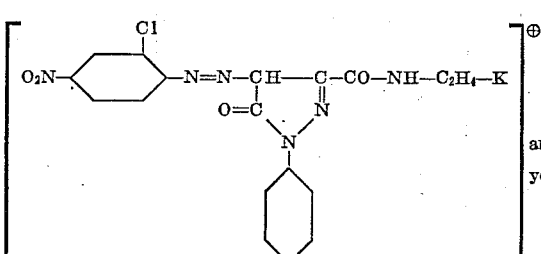

EXAMPLE 95b

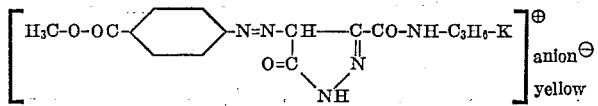

EXAMPLE 95c

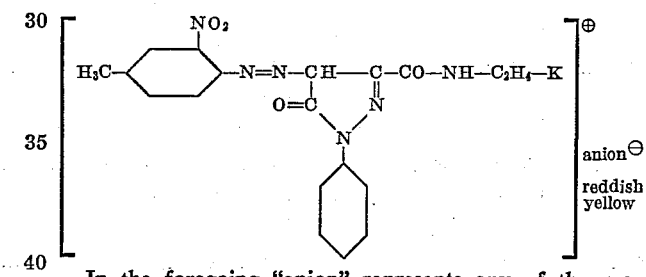

In the foregoing "anion" represents any of the previously enumerated anions.

EXAMPLE 96

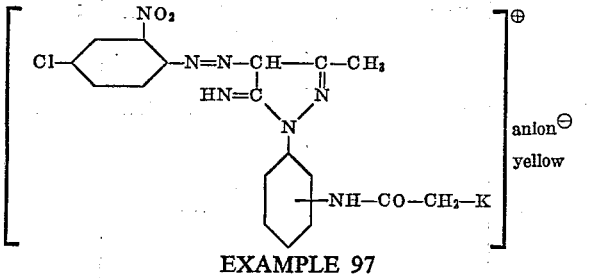

EXAMPLE 97

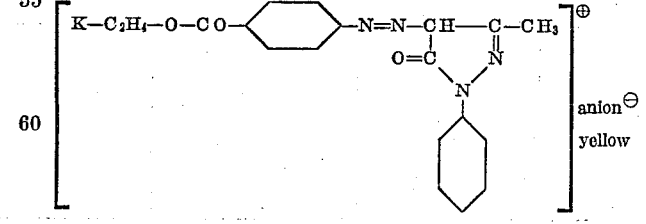

EXAMPLE 98

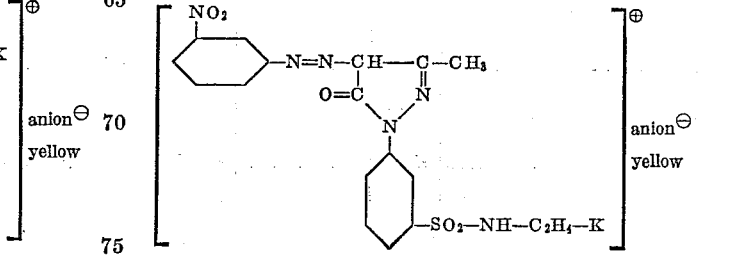

The new dyes, synthesized with a heterocyclic diazo compound containing nitrogen, which correspond to the types listed in the previous table, can be converted into multiply charged dye cations with suitable quaternating agents. The quaternation of a ternary, heterocyclic N-atom is known. The methods described in the literature are suitable for the present purpose. On the other hand, the reaction products formed are new. A characteristic of their constitution is the simultaneous presence of hydrazinium and cycloammonium groupings. A suitable method of production is described in the following example.

EXAMPLE 99

2.5 parts of the dye of the formula

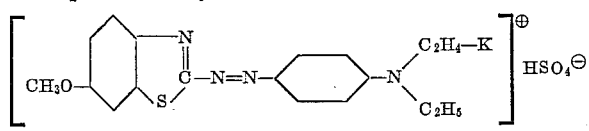

are dissolved in 50 parts of nitromethane and heated at 80°. At a temperature range of 80–90°, 0.8 parts of dimethyl sulfate are dropped in and the mixture stirred for 12 hours at 80°. The solvent is subsequently distilled off under reduced pressure. The dry distillation residue is then absorbed in the water/alcohol mixture, dissolved hot, and after filtering clear, left to cool. The precipitated dye of the formula

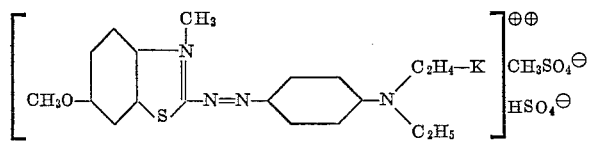

is obtained in excellent yield. It dissolves in water with a blue coloration and dyes polyacrylonitrile fibers in brilliant blue shades from acetic acid, neutral or mineral acid baths, in which it is stable to prolonged boiling.

The dyeings on polyacrylonitrile fibers have excellent fastness to light, washing, perspiration, sublimation, rubbing, wet and dry ironing, sea water, gas fumes, bleaching, cross dyeing and dry cleaning. The dye reserves wool and cellulosic fibers present in the same dyebath. The dyeings are level in shade and the dyes possess better levelling properties than those of a similar constitution produced for example from the same diazo compound and diethylaminobenzene as coupling component.

Further basic dyes of the type named, which are produced according to the method of Example 99, are:

(100)

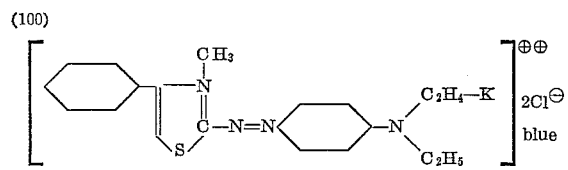

(101)

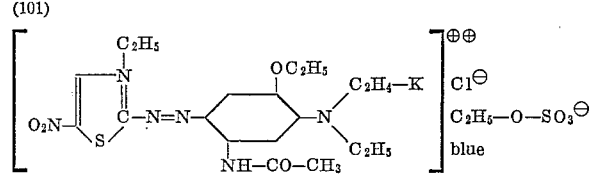

(102)

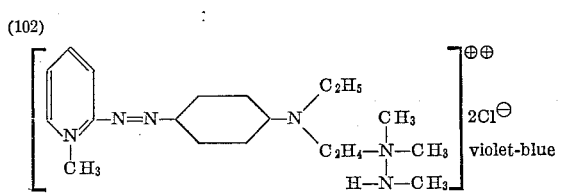

(103)

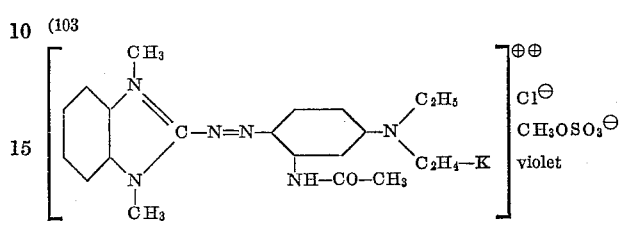

(104)

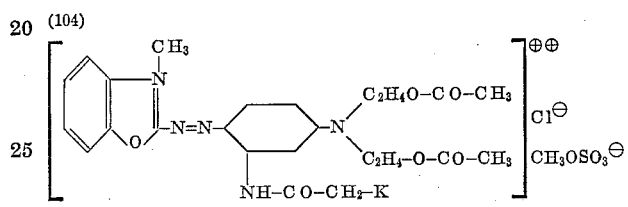

The possibility of varying the dyes which can be produced according to the invention is increased by the fact that the diazo compound can also be a carrier of the hydrazinimum base.

In addition to the azo compounds already mentioned, the following are suitable for the production of the dyes conforming to the invention:

Azo compounds of the benzene and naphthalene series, e.g.

4-methylphenol,
4-tert.butylphenol,
2-methoxy-5-methylaniline,
N-ethylaniline,
2,5-dimethoxy-N-ethylaniline,
3-acetylamino-N-cyanethylaniline,
N-cyanethyl-N-oxethylaniline,
N-2-difluoroethyl-N-acetoxyethylaniline,
3-propionylamino-N.N-diacetoxyethylaniline,
N-methoxyethyl-N-cyanethylaniline,
N-cyanethoxy-N-ethylaniline,
3-chloro-N-chloroethyl-N-ethylaniline,
N-dimethylaminoethyl-N-ethylaniline,
Phenylcarbamidic acid-(β-ethyl-3-toluidino)-ethylester,
Aniline-N.N-dicarbamidic acid ethyl ester,
2-methoxy-5-cyano-N-β-γ-dihydroxypropyl-N-cyanethyl-aniline,
Coupling compounds of the naphthol AS type,
Derivatives of diphenyl amine,
3-nitro-5-cyanethyl-N-ethyl-aniline,
5,6,7,8-tetrahydro-2-hydroxynaphthalene,
1-amino-2-oxynaphthalene ethyl ether,
8-acetylamino-2-naphthol,
2-aminonaphthalene,
1-cyanethylaminonaphthalene,
Oxethylaminoaphthalene.

In addition the usual heterocyclic coupling components and/or those with an active methylene group are worthy of mention also can be used. Examples are:

8-hydroxyquinoline-, 1-phenyl-3-methylpyrazolone-5, and substitution products derived from them such as 1-(3'-chlorophenyl-)-3-methylpyrazolone-5, 1-ethyl-3-carboxylic acid amide-pyrazolone-5, 1-cyanethyl-3-carbethoxypyrazolone-5, 1-phenyl-3-methyl-5-aminopyrazol, 2-methylindole, N-phenyl-3 - oxypyrrolidine, α-cyanoacetophenone, acetoacetylanilide and its derivatives, 1,3-diketones and their derivatives such as e.g. indandiones.

Examples of dyes of this type are:
(105)
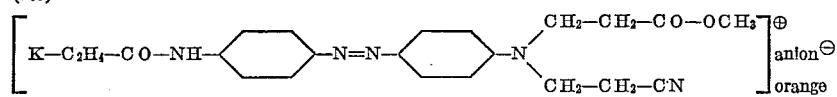
(106)
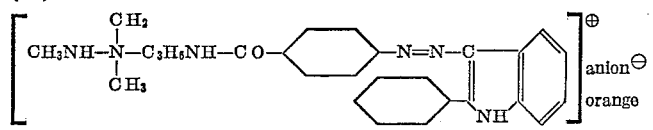
(107)
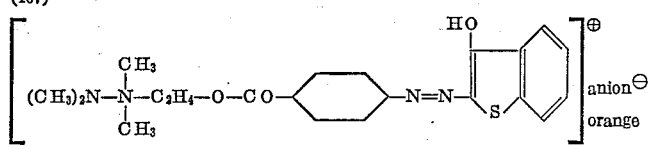
(108)
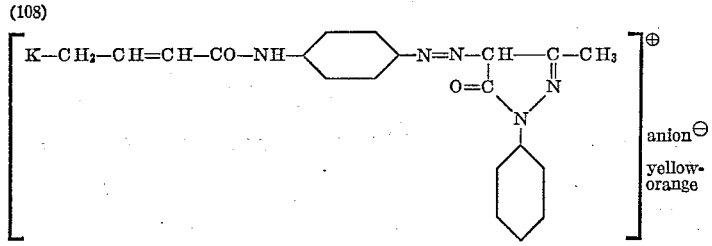
(109)
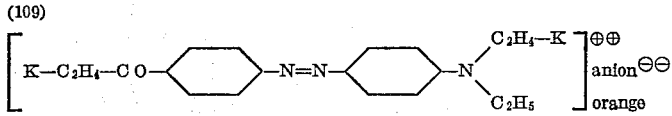
(110)
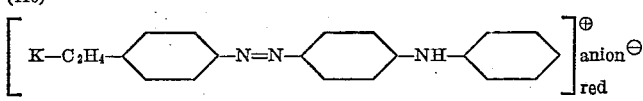
(111)
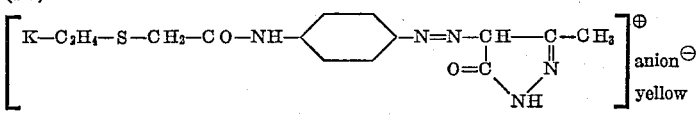
(112)
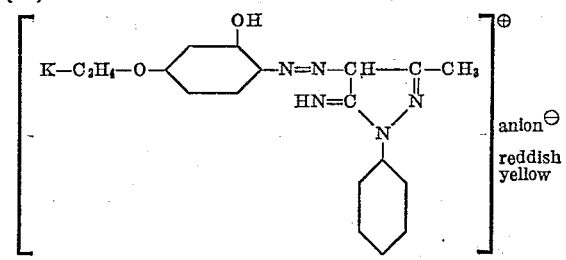
(113)
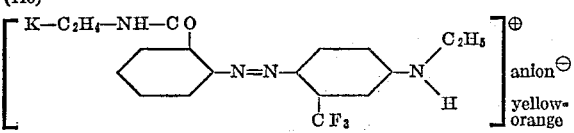
(114)
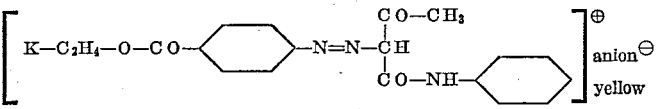
(115)
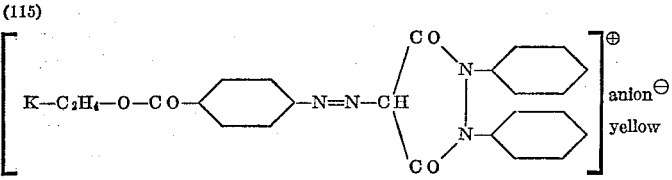

The o,o'-dioxy or o,o'-oxyamino compounds, together with the ions of heavy metal such as Fe, Cu, Ni, Cr, Mn, are suitable for the formation of 1:1 and 1:2 metal-complex dyes.

EXAMPLE 116

25.6 parts of the monoazo dye 4'-nitro-4-amino-2-methylazobenzene produced by the known method are diazotized in finely dispersed form in aqueous hydrochloric acid with 20 parts of a 4 N aqueous sodium nitrite solution at 10–20°. The resulting diazonium salt is added to a soda-alkaline solution containing 24.5 parts of the coupling component of the formula

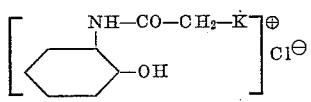

The coupling reaction takes place immediately. To isolate the dye, the mixture is rendered acid with aqueous hydrochloric acid, and the dye filtered off, rinsed and dried.

It has the formula

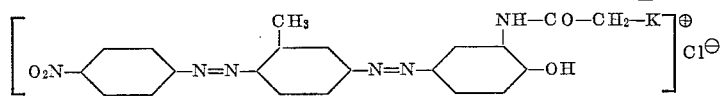

and dyes polyacrylonitrile fibers in orange shades.

Further valuable basic disazo dyes correspond to the formulae:

(117)
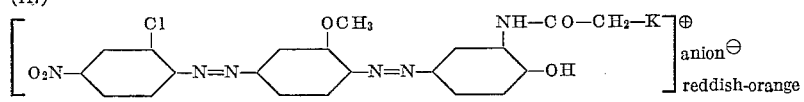
reddish-orange (118)
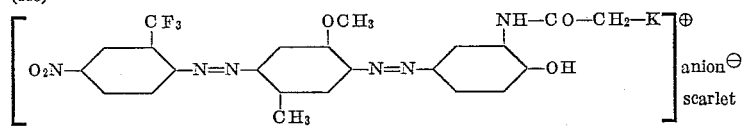
scarlet (119)
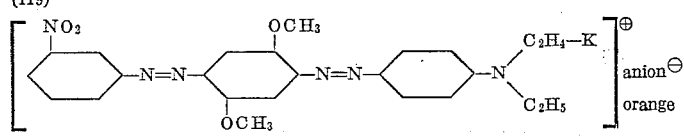
orange (120)
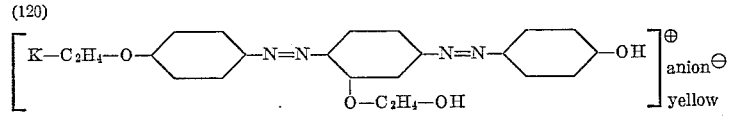
yellow (121)
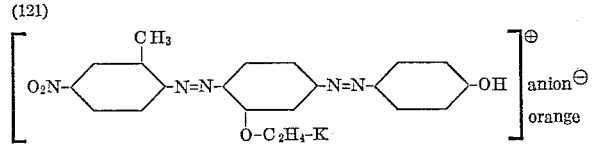
orange (122)
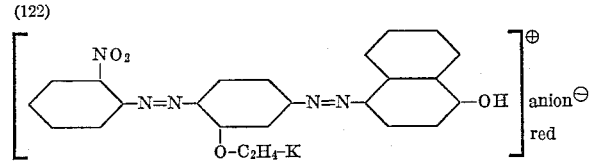
red (123)
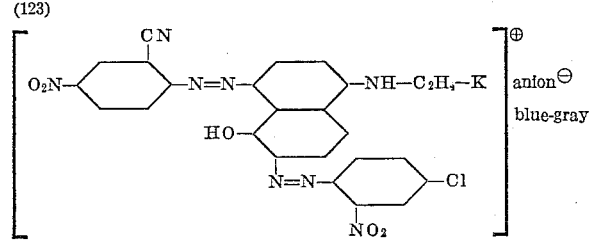
blue-gray Formulae of representative dyes of the foregoing examples are as follows:
(The symbol K stands for the grouping

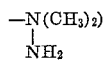

EXAMPLE 2
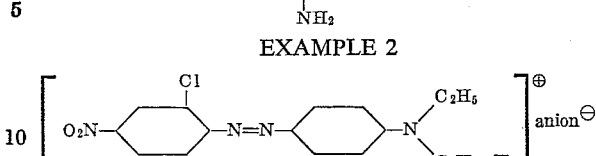

EXAMPLE 5
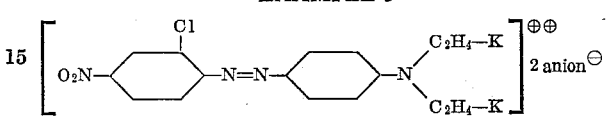

EXAMPLE 8a
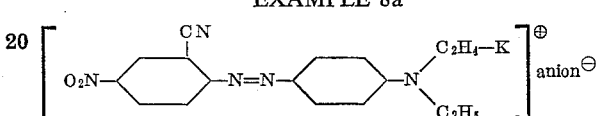

EXAMPLE 8b
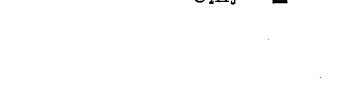

EXAMPLE 21
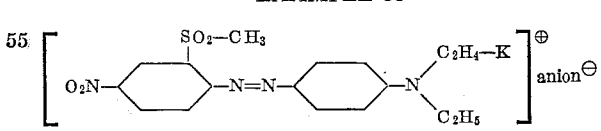

EXAMPLE 35
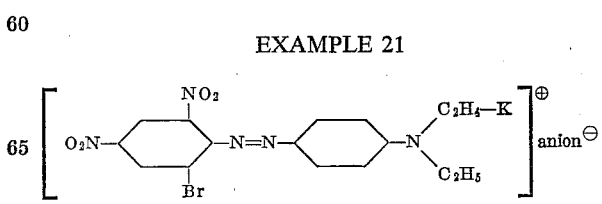

EXAMPLE 44

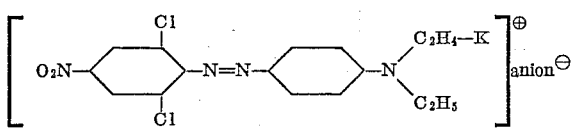

EXAMPLE 85

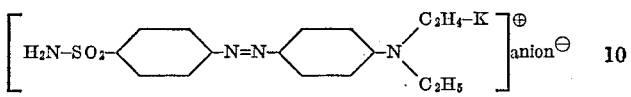

EXAMPLE 95

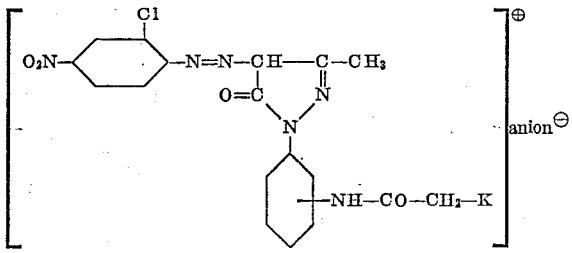

EXAMPLE 97

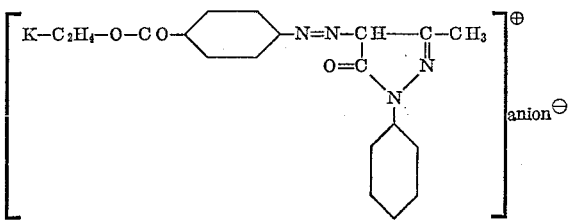

EXAMPLE 98

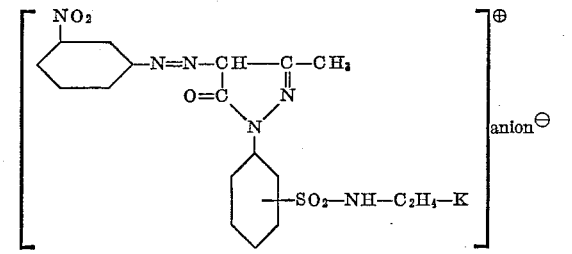

EXAMPLE 99

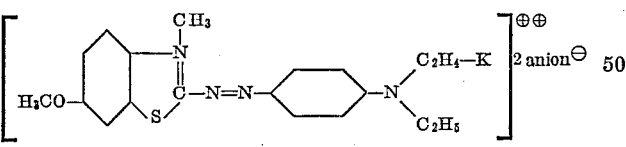

EXAMPLE 116

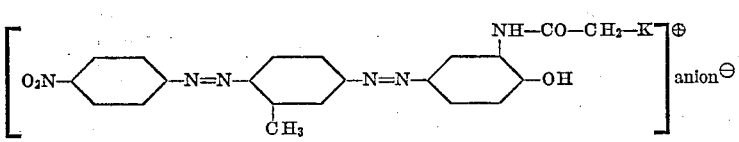

Having thus disclosed the invention what we claim is:

1. A basic dyestuff of the formula:

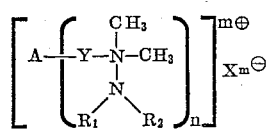

wherein

A is the radical of a disazo dyestuff, said dyestuff being free from carboxylic and sulfonic acid groups, y is a bridge member selected from the group consisting of

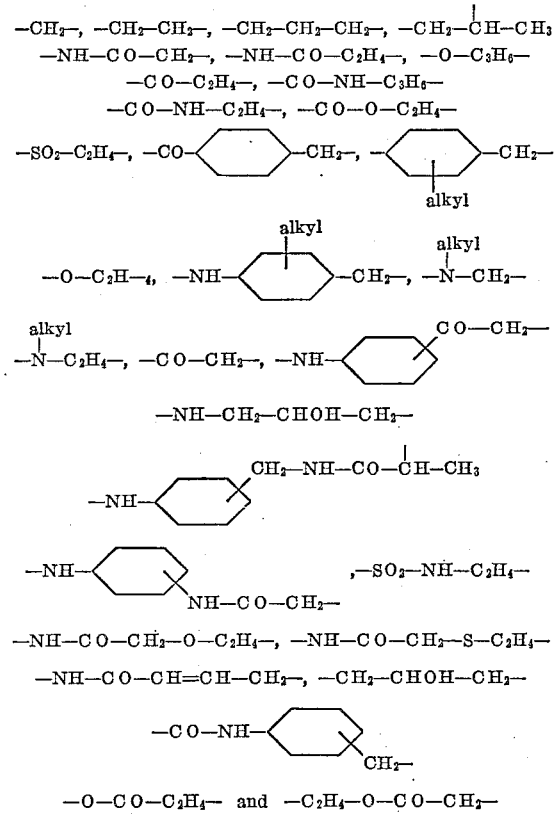

"alkyl" being lower alkyl in each occurrence thereof, $R_1$ is a member selected from the group consisting of hydrogen and methyl, $R_2$ is a member selected from the group consisting of hydrogen and methyl, $n$ is a positive integer of up to 2, $m$ is a positive integer of up to 2 and when $n$ is 2, $m$ is 2, and X is an anion.

2. A basic dyestuff of the formula

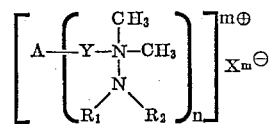

wherein

A is the radical of a substituted monoazo dyestuff, the substituents of which are selected from the group consisting of chlorine, bromine, fluorine, nitrile, nitro, lower alkyl, tri-halogen(lower)alkyl, lower alkoxy, hydroxy, lower alkanoyl, carbalkoxy, carboxylic acid amido, lower alkanoylamino, benzoyl amino, lower alkyl sulfonyl, chloro(lower)alkyl sulfonyl, sulfonamido, lower alkyl sulfonamido, di-(lower)alkyl sulfonamido, alkylaminosulfonylamino, di-(lower)alkylaminosulfonylamino, phenyl, mercapto, lower alkanoylamino, fluorosulfonyl, phenylamino, lower alkoxyphenylamino and chloro(lower)alkylsulfonyl, Y is a bridge member selected from the group consisting of

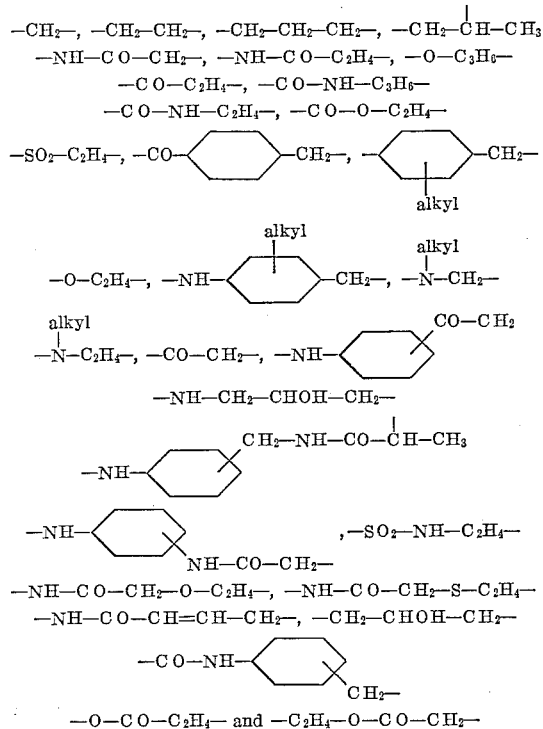

"alkyl" being lower alkyl in each occurrence thereof,
$R_1$ and $R_2$ is a member selected from the group consisting of hydrogen and methyl,
n is a positive integer of up to 2,
m is a positive integer of up to 2 and when n is 2, m is 2, and
X is an anion.

3. The basic dyestuff of the formula

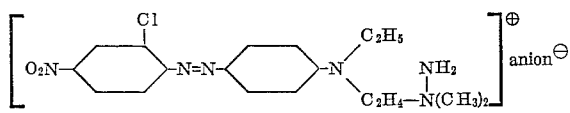

4. The basic dyestuff of the formula

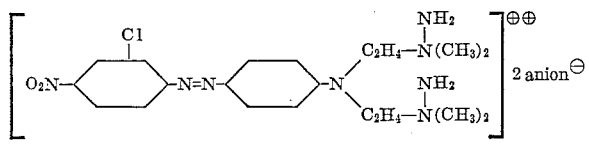

5. The basic dyestuff of the formula

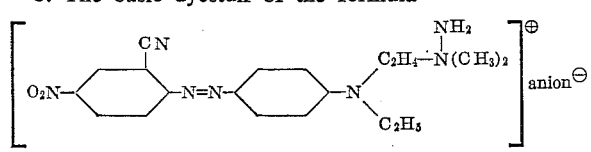

6. The basic dyestuff of the formula

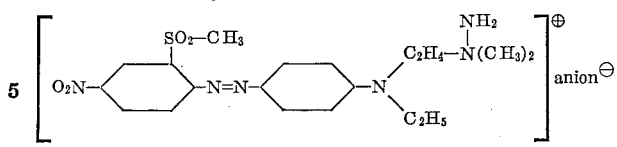

7. The basic dyestuff of the formula

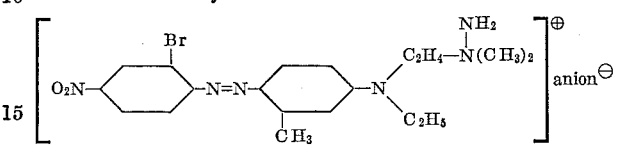

8. The basic dyestuff of the formula

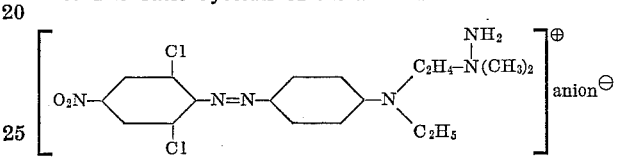

9. The basic dyestuff of the formula

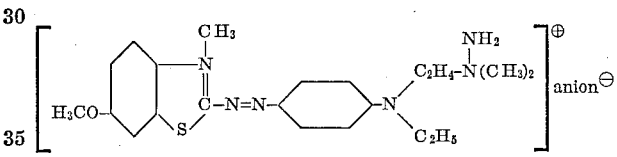

10. The basic dyestuff of the formula

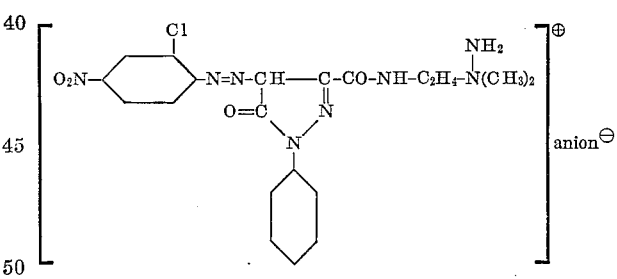

References Cited by the Examiner
UNITED STATES PATENTS
2,357,317  9/1944  Dickey _____ 260—152 XR
2,955,108  10/1960  Omietanski _____ 260—205

CHARLES B. PARKER, *Primary Examiner.*
LEON ZITVER, *Examiner.*
REYNOLD J. FINNEGAN, *Assistant Examiner.*